United States Patent
Lee et al.

(10) Patent No.: US 10,860,856 B2
(45) Date of Patent: Dec. 8, 2020

(54) METHOD AND APPARATUS FOR PROVIDING INFORMATION BASED ON IMAGE

(71) Applicant: LG ELECTRONICS INC., Seoul (KR)

(72) Inventors: Eun Sang Lee, Bucheon-si (KR); Hye Young Koo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/567,331

(22) Filed: Sep. 11, 2019

(65) Prior Publication Data

US 2020/0005042 A1 Jan. 2, 2020

(30) Foreign Application Priority Data

Aug. 6, 2019 (KR) .......................... 10-2019-0095658

(51) Int. Cl.
*G06T 19/00* (2011.01)
*G06K 9/00* (2006.01)
*G06F 3/0484* (2013.01)
*G06T 7/70* (2017.01)

(52) U.S. Cl.
CPC ........ *G06K 9/00671* (2013.01); *G06F 3/0484* (2013.01); *G06T 7/70* (2017.01); *G06T 19/006* (2013.01)

(58) Field of Classification Search
CPC .............. G06K 9/00671; G06F 3/0484; G06F 3/04815; G06F 3/0488; G06T 7/70; G06T 19/006
See application file for complete search history.

(56) References Cited

U.S. PATENT DOCUMENTS

| 2011/0164163 A1* | 7/2011 | Bilbrey | H04N 5/23293 348/333.01 |
| 2015/0070347 A1* | 3/2015 | Hofmann | G06T 19/006 345/419 |

FOREIGN PATENT DOCUMENTS

| KR | 10-2012-0113945 A | 10/2012 |
| KR | 10-2018-0130911 A | 12/2018 |

* cited by examiner

*Primary Examiner* — Robert J Craddock
(74) *Attorney, Agent, or Firm* — Birch, Stewart, Kolasch & Birch LLP

(57) ABSTRACT

An image-based information providing apparatus capable of executing a mounted artificial intelligence (AI) algorithm and/or machine learning algorithm and communicating with other electronic devices and an external server in a 5G communication environment is provided. The image-based information providing apparatus includes a camera, a display, and a processor. Therefore, it is possible to correctly recognize an object to be photographed, and provide various services for the convenience of a user.

16 Claims, 16 Drawing Sheets

[Fig. 1]
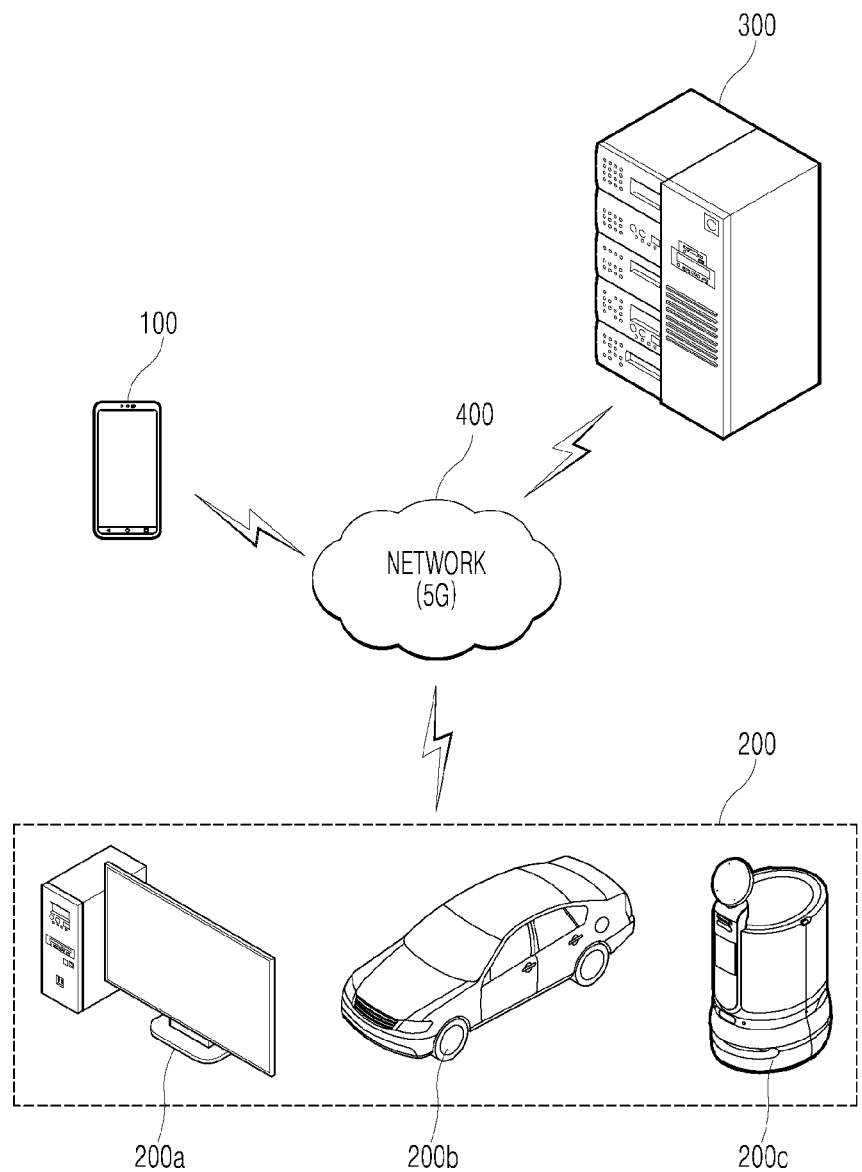

[Fig. 2]
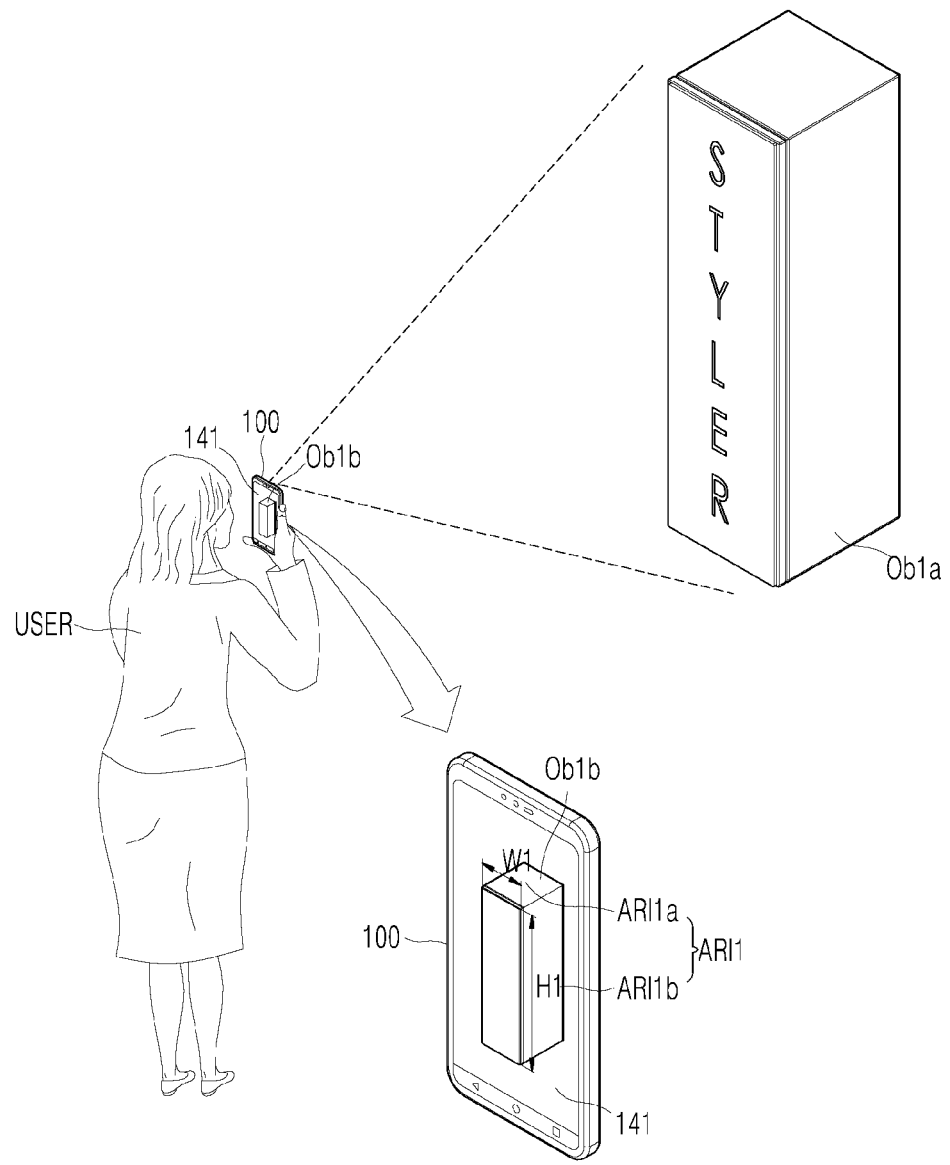

[Fig. 3]
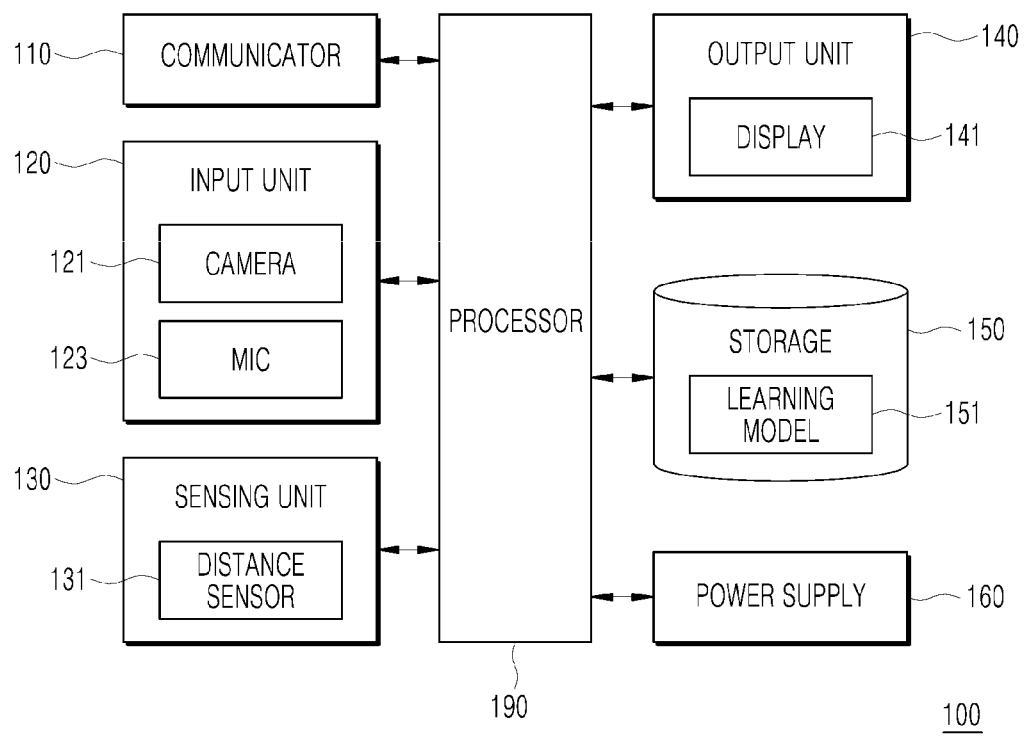

[Fig. 4]
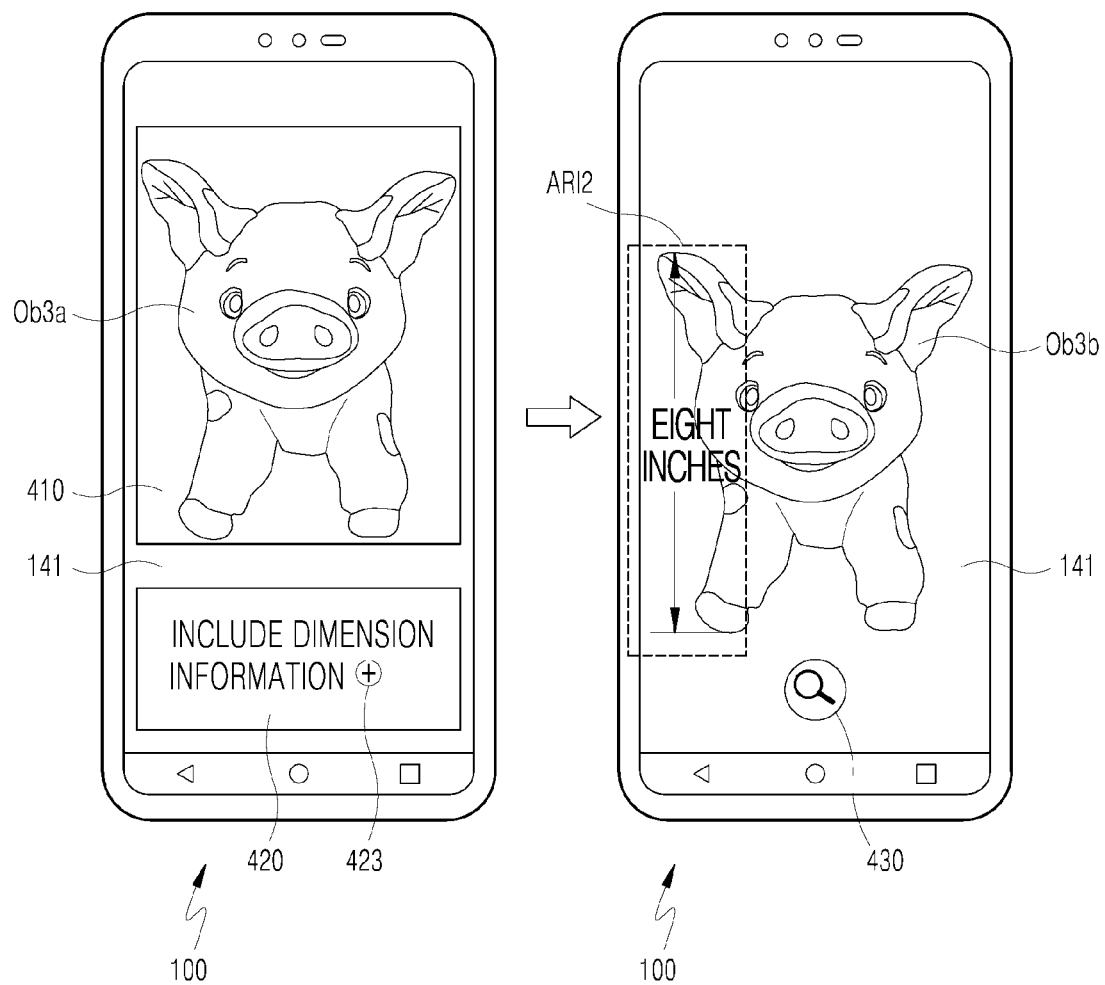

[Fig. 5]
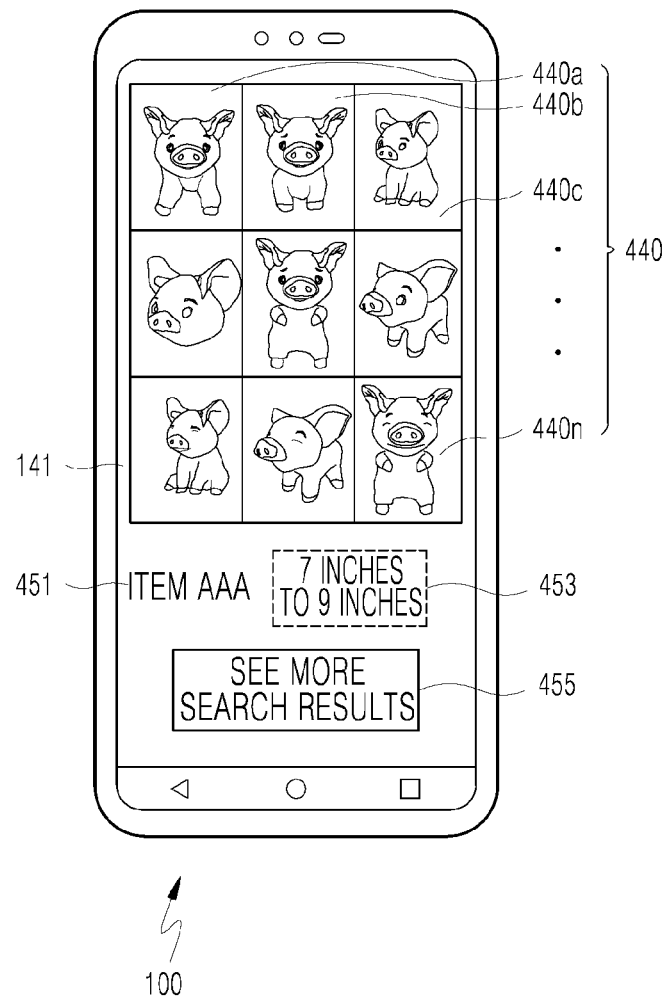

[Fig. 6]
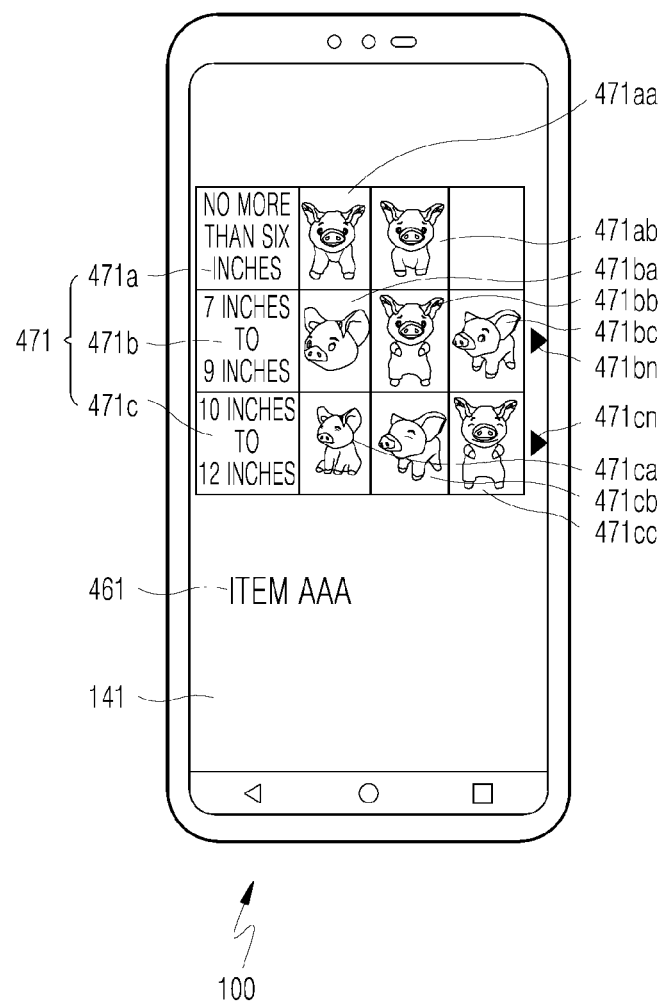

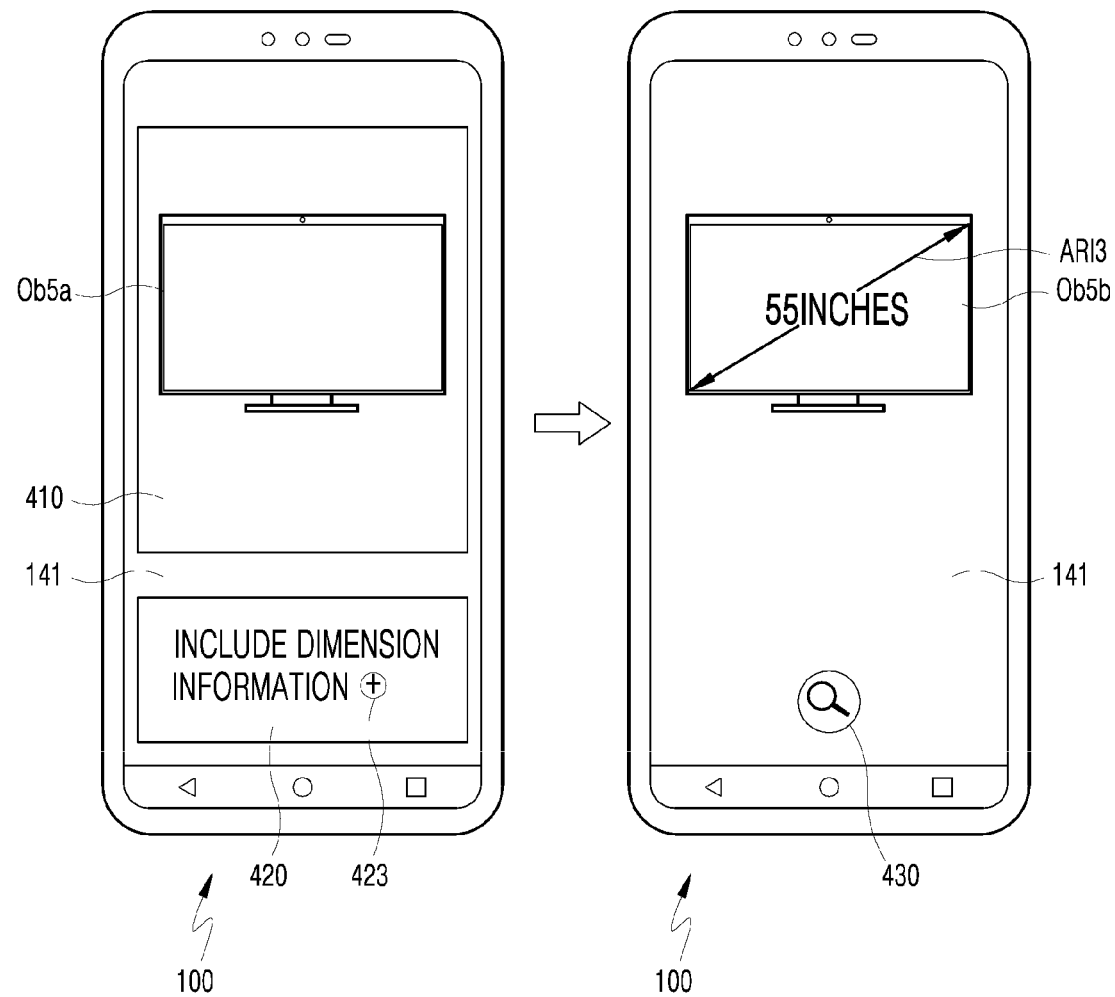
[Fig. 7]

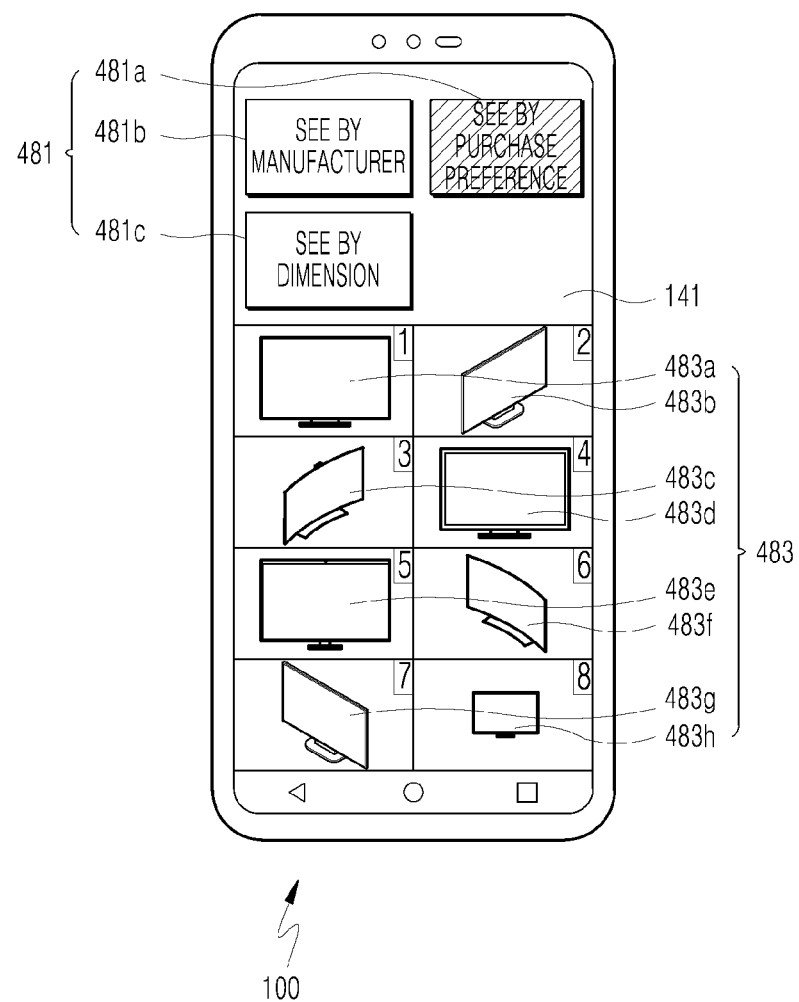
[Fig. 8]

[Fig. 9]
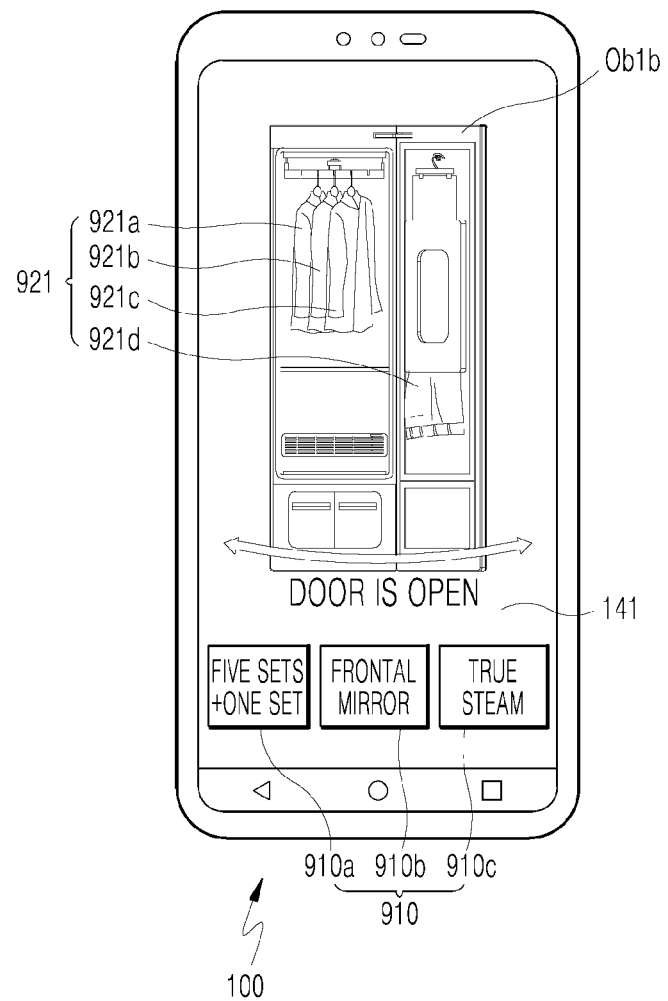

[Fig. 10]
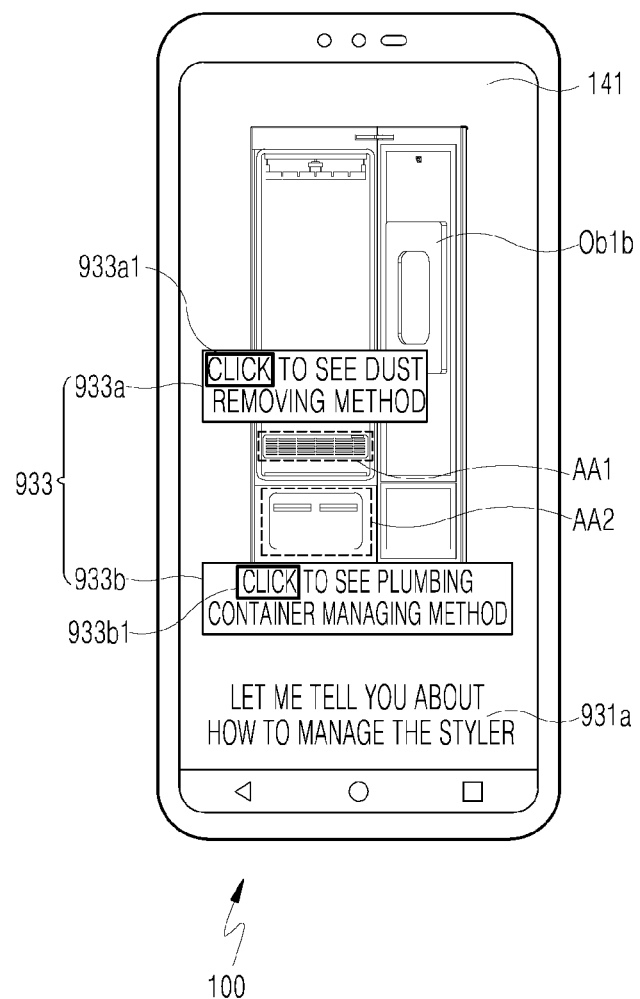

[Fig. 11]
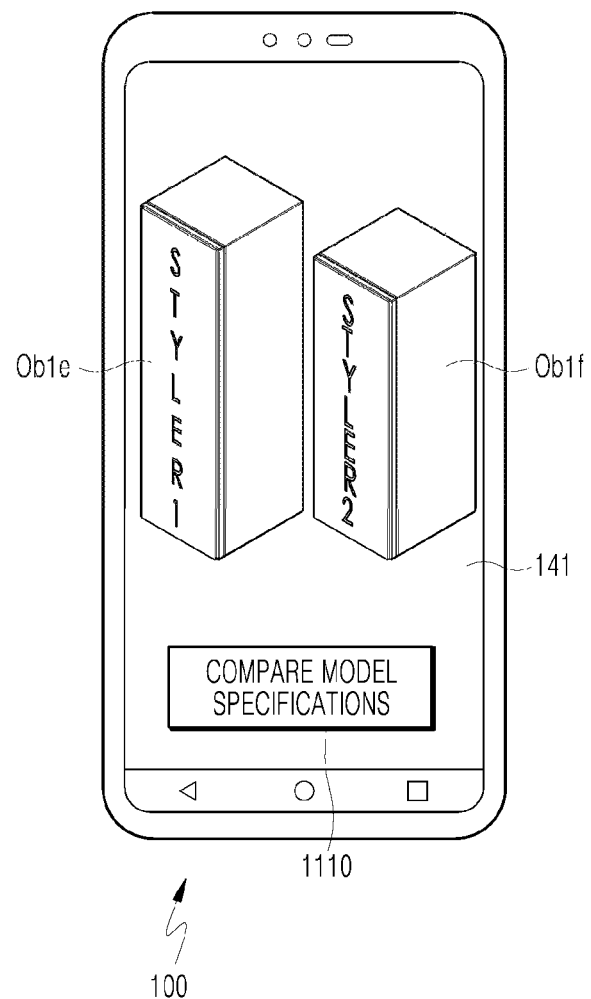

[Fig. 12]
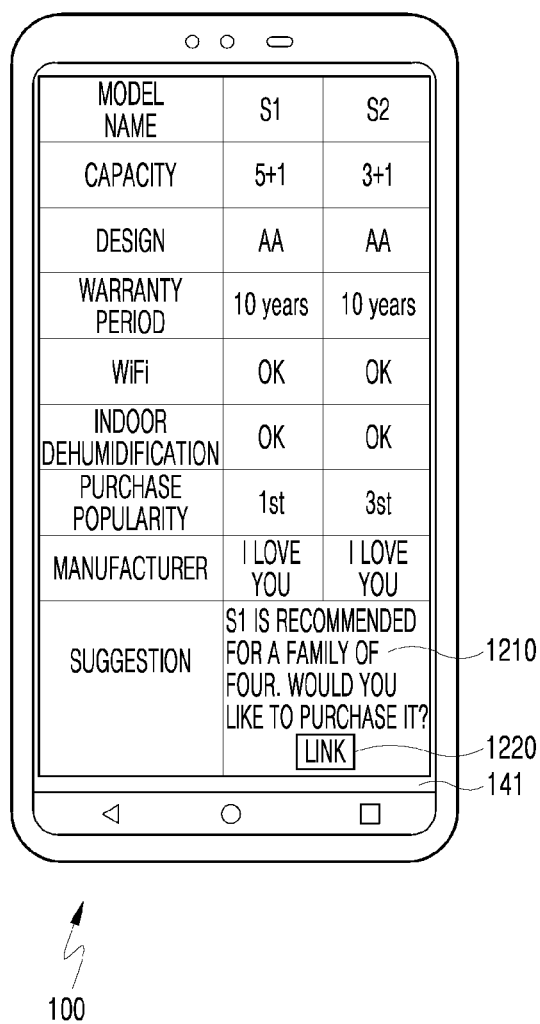

[Fig. 13]
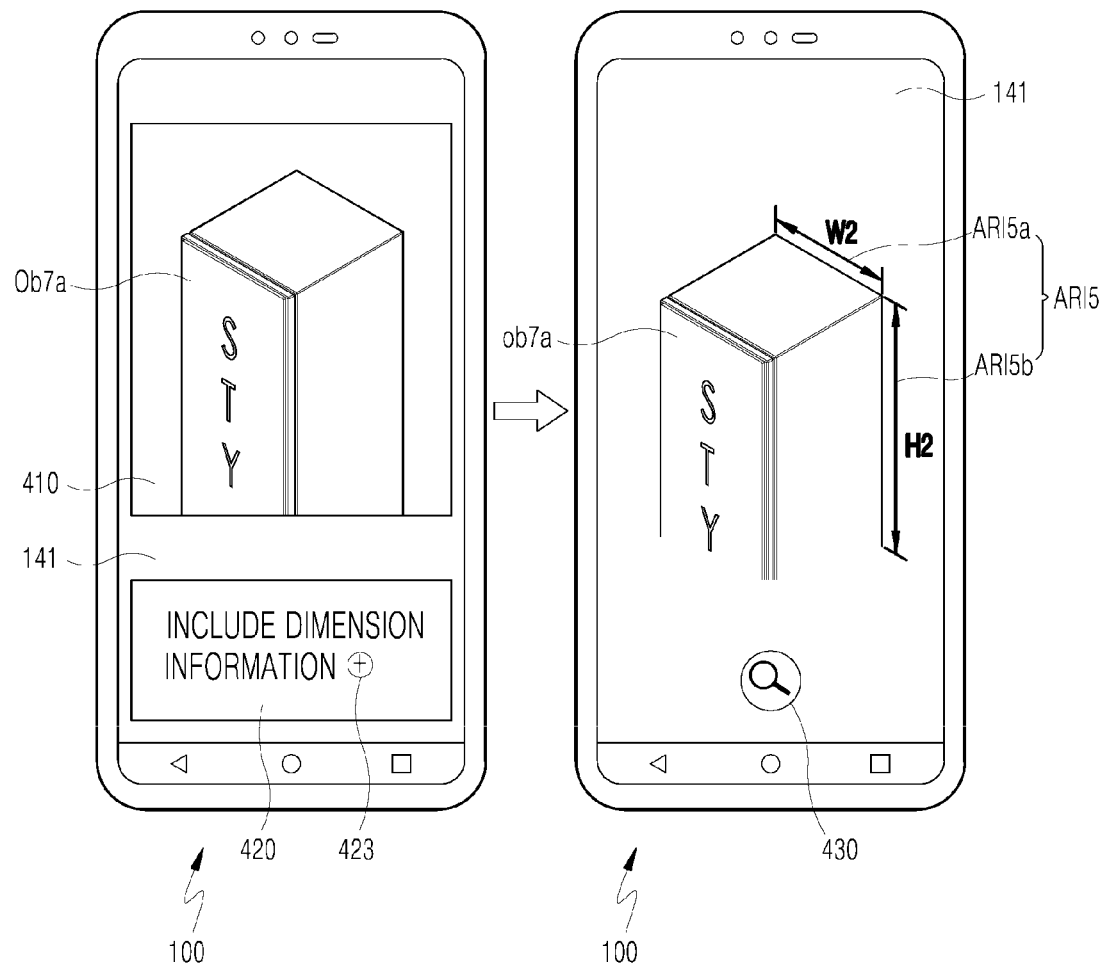

[Fig. 14]
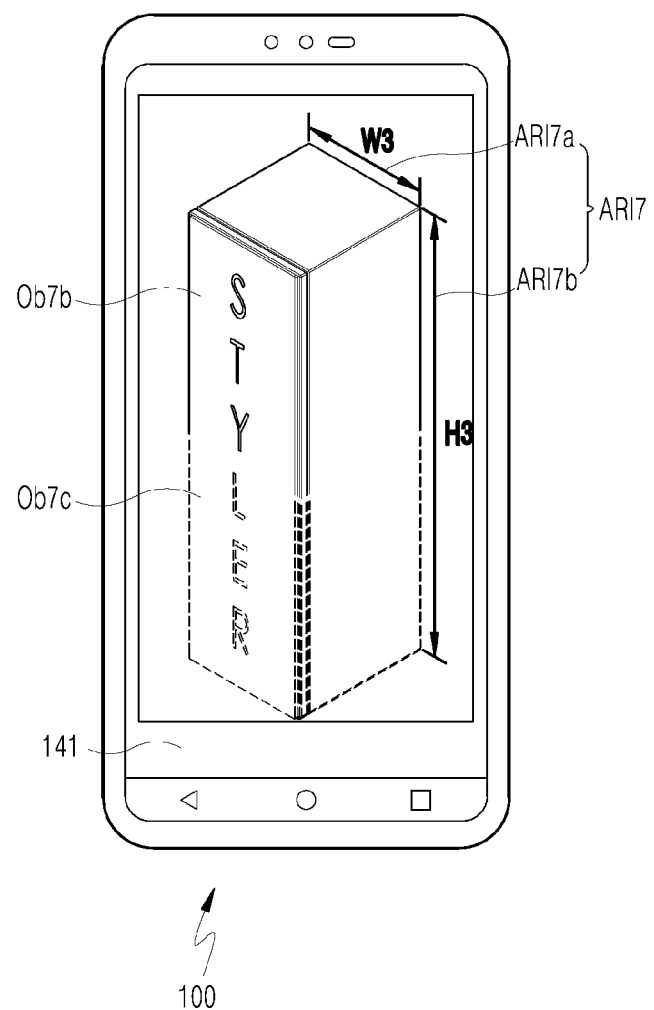

[Fig. 15]
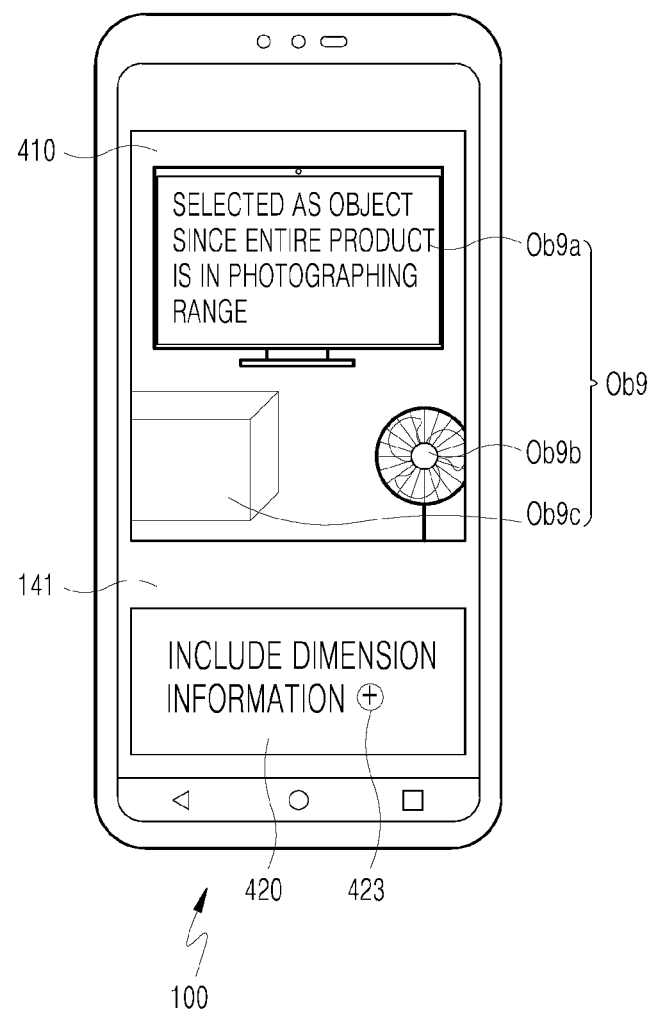

[Fig. 16]
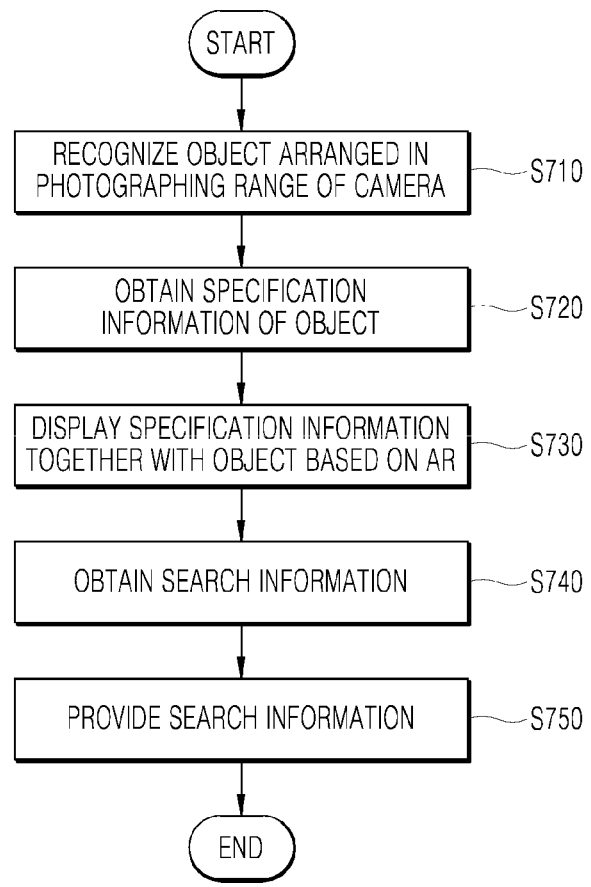

METHOD AND APPARATUS FOR PROVIDING INFORMATION BASED ON IMAGE

CROSS-REFERENCE TO RELATED APPLICATION

This present application claims benefit of priority to Korean Patent Application No. 10-2019-0095658, entitled "METHOD AND APPARATUS FOR PROVIDING INFORMATION BASED ON IMAGE" filed on Aug. 6, 2019, in the Korean Intellectual Property Office, the entire disclosure of which is incorporated herein by reference.

BACKGROUND

1. Technical Field

The present disclosure relates to a method and apparatus for providing image-based information, and more particularly, to an image-based information providing method and apparatus for obtaining specification information of an object arranged in a photographing range and correctly recognizing the object.

2. Description of Related Art

Terminals may be divided into mobile terminals and stationary terminals, depending on whether the terminal may be moved. Mobile terminals may be divided into handled terminals and vehicle mounted terminals, depending on whether a user may directly carry the mobile terminal.

Functions of mobile terminals are diversifying. In accordance with developments relating to camera performance, various functions using cameras are being developed. For example, functions of capturing high quality still images or moving images, or generating three-dimensional images by using depth information of images received through cameras, are being actively developed.

In the augmented reality (AR) based service system disclosed in Related Art 1, an immersive user interface is provided by adding a background image to an image photographed in a virtual studio, based on AR.

However, in Related Art 1, only photographed content of an object to be photographed is disclosed, and there is no disclosure regarding a method of correctly recognizing an object to be photographed.

In the golf swing matching analyzing system disclosed in Related Art 2, a swing image of a user is photographed, and a swing image of a professional golfer based on AR overlaps with the photographed swing image of the user, and accordingly, exercise capacity of the user may improve.

However, in Related Art 2, while contents relating to measuring size information of the user are disclosed, the size measuring information is restrictively applied only to exercise, and there is no disclosure regarding a method of correctly recognizing an object.

SUMMARY OF THE INVENTION

An aspect of the present disclosure is to provide an image-based information providing method and apparatus for correctly obtaining item information or model information by using specification information of an object for vision recognition.

Another aspect of the present disclosure is to provide an image-based information providing method and apparatus for displaying specification information of an object arranged in a photographing range based on augmented reality.

Still another aspect of the present disclosure is to provide an image-based information providing method and apparatus for providing a user-friendly service based on correctly recognized item information.

Aspects of the present disclosure are not limited to those described above. Further aspects that are not mentioned may be clearly understood by those skilled in the art in the technical field to which the present disclosure belongs from the following description.

An image-based information providing method according to an embodiment of the present disclosure may correctly recognize an object by using a recognized object and specification information of the object.

The image-based information providing method includes recognizing an object arranged in a photographing range of a camera, obtaining specification information of the object, displaying the specification information of the object together with the object based on augmented reality (AR), obtaining search information based on the specification information of the object when a predetermined search command is inputted, and providing the search information.

The image-based information providing method may further include obtaining item information of the object based on the specification information of the object.

The obtaining of the search information may include obtaining information on one or more search items having similarity in a predetermined range to the item information of the object, based on a previously stored learning model for inferring result data based on input data.

The obtaining of the search information may include transmitting the item information of the object to an information providing system, and obtaining information on one or more search items having similarity in a predetermined range to the item information of the object from the information providing system.

The providing of the search information may include providing the information on the search item with similarity to the specification information of the object prioritized.

The providing of the information on the search item may include setting similarity to the specification information of the object as a filter and filtering information on a search item of which the similarity is outside a predetermined range, and providing information on a search item in the predetermined range.

The providing of the search information may include providing at least one of external appearance information of the item, function information of the item, shape information of the item, or a method of use of a configuration of the item, based on the item information of the object.

When one or more search items of the same kind and having different specification information are searched, the providing of the search information may include comparing data information on the one or more search items with each other, and providing the comparison result.

When only a partial region of the object is recognized, the obtaining of the specification information of the object may include obtaining specification information of the partial region. The obtaining of the search information may include transmitting information on the partial region and the specification information of the partial region to an information providing system, and obtaining information on a search item with similarity in a predetermined range to the information on the partial region and the specification information of the partial region.

The providing of the search information may include displaying a partial region of the object, extracting a remaining region other than the partial region of the object from the information on the search item, and providing the extracted region based on AR.

When one or more objects are recognized in a photographing range of the camera, the recognizing of the object may include selecting an object by a manipulation of a user, or selecting an object that occupies the greatest part of a photographed region.

An image-based information providing apparatus according to another embodiment of the present disclosure may include an input unit including a camera, a display, and a processor configured to recognize an object arranged in a photographing range of the camera and obtain specification information of the recognized object. The processor may display the specification information of the object on the display together with the object based on augmented reality (AR), obtain search information based on the object and the specification information when a predetermined search command is inputted through the input unit, and provide the obtained search information.

The processor may obtain item information of the object based on the specification information of the object.

The image-based information providing apparatus may further include a storage configured to store a learning model for inferring result data based on input data. The processor may obtain information on one or more search items with similarity in a predetermined range to item information of the object, based on the learning model.

The image-based information providing apparatus may further include a communicator configured to communicate with an information providing system. The processor may transmit the item information of the object to the information providing system through the communicator, and obtain information on one or more search items with similarity in a predetermined range to the item information of the object from the information providing system through the communicator.

The processor may provide, through the display, the information on the search item through the display with similarity to the specification information of the object prioritized.

The processor may set similarity to the specification information of the object as a filter and filter information on a search item of which the similarity is outside a predetermined range, and provide information on a search item in the predetermined range.

The processor may provide, through the display, at least one of external appearance information of the item, function information of the item, shape information of the item, or a method of use of a configuration of the item, based on the item information of the object.

When one or more search items of the same kind and having different specification information are searched, the processor may compare data information on the one or more search items with each other, and may provide the comparison result through the display.

When only a partial region of the object is recognized, the processor may obtain specification information of the partial region, transmit information on the partial region and the specification information of the partial region to an information providing system through the communicator, and obtain information on a search item with similarity in a predetermined range to the information on the partial region and the specification information of the partial region, from the information providing system through the communicator.

Embodiments of the present disclosure are not limited to those described above. Other embodiments that are not mentioned may be clearly understood by those skilled in the art from the following description.

According to various embodiments of the present disclosure, the following effects may be obtained.

First, item information of an object arranged in a photographing range may be correctly obtained.

Second, since service information to be searched by a user based on the correctly obtained item information may be provided with high precision, convenience of the user may be secured.

Third, immersion of use may be increased by displaying specification information based on AR.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a schematic diagram illustrating a network environment in which an image-based information providing apparatus, various devices, and an information providing system are connected to each other according to an embodiment of the present disclosure;

FIG. 2 is a view schematically illustrating an operation of an image-based information providing apparatus according to an embodiment of the present disclosure;

FIG. 3 is a block diagram illustrating a configuration of an image-based information providing apparatus according to an embodiment of the present disclosure;

FIGS. 4 to 16 are views illustrating an operation of an image-based information providing device according to various embodiments of the present disclosure;

FIG. 4 is a view illustrating an operation of an image-based information providing apparatus for displaying specification information of an object based on augmented reality (AR) according to an embodiment of the present disclosure;

FIG. 5 is a view illustrating an operation of an image-based information providing apparatus for displaying information on a search item by a method according to an embodiment of the present disclosure;

FIG. 6 is a view illustrating an operation of an image-based information providing apparatus for displaying information on a search item by another work according to an embodiment of the present disclosure;

FIG. 7 is a view illustrating an operation of an image-based information providing apparatus for displaying specification information of an object based on AR according to another embodiment of the present disclosure;

FIG. 8 is a view illustrating an operation of an image-based information providing apparatus for displaying information on a search item according to another embodiment of the present disclosure;

FIG. 9 is a view illustrating an operation of an image-based information providing apparatus for displaying an internal region of a search item and providing function information according to an embodiment of the present disclosure;

FIG. 10 is a view illustrating an operation of an image-based information providing apparatus for displaying an internal region of a search item and providing information on a method of use according to another embodiment of the present disclosure;

FIG. 11 is a view illustrating an operation of an image-based information providing apparatus for providing one or more search items of the same kind and having different specification information according to an embodiment of the present disclosure;

FIG. 12 is a view illustrating an operation of an image-based information providing apparatus for providing a table for comparing information items on search items when a specific menu of FIG. 11 is selected;

FIG. 13 is a view illustrating an operation of an image-based information providing apparatus when only a partial region of an object is recognized according to an embodiment of the present disclosure;

FIG. 14 is a view illustrating an operation of an image-based information providing apparatus when a search command relating to the object of FIG. 13 is inputted;

FIG. 15 is a view illustrating an operation of an image-based information providing apparatus when a plurality of objects are recognized according to an embodiment of the present disclosure; and FIG. 16 is a sequence diagram illustrating a method of driving an image-based information providing apparatus according to an embodiment of the present disclosure.

DETAILED DESCRIPTION

Since artificial intelligence (AI) and extended reality (XR) may be applied to various embodiments of the present disclosure, an outline of AI and XR will be described below.

AI refers to a field of studying the AI or a methodology for creating the same. Moreover, machine learning refers to a field of defining various problems in the field of AI, and studying methodologies for solving the problems. Machine learning may also be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In the ANN, each neuron may output a function value of an activation function with respect to the input signals inputted through a synapse, weight, and bias.

Model parameters refers to parameters determined through learning, and may include weights of synapse connection, biases of neurons, and the like. Moreover, hyperparameters refer to parameters which are set before learning in a machine learning algorithm, and include a learning rate, a number of repetitions, a mini-batch size, an initialization function, and the like.

The objective of training an ANN is to determine model parameters for significantly reducing a loss function. The loss function may be used as an indicator for determining an optimal model parameter during the learning process of an ANN.

Machine learning may be classified into supervised learning, unsupervised learning, and reinforcement learning, depending on the learning method.

Supervised learning may refer to a method for training the ANN with training data that has been given a label. In addition, the label may refer to a target answer (or a result value) to be guessed by the ANN when the training data is inputted to the ANN. Unsupervised learning may refer to a method for training the ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and deep learning is one machine learning technique. Hereinafter, the meaning of machine learning includes deep learning.

Extended reality (XR) collectively refers to virtual reality (VR), augmented reality (AR), and mixed reality (MR). VR technology provides real world objects or backgrounds only in the form of CG images, AR technology provides virtual CG images overlaid on real object images, and MR technology employs computer graphics technology to mix and combine virtual objects with the real world.

MR technology is similar to AR technology in that both technologies involve physical objects being displayed together with virtual objects. However, while virtual objects supplement physical objects in AR, virtual and physical objects co-exist as equivalents in MR.

XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

Hereinafter, embodiments disclosed in the current specification will be described in detail with reference to the accompanying drawings. Like reference numerals designate like elements throughout the specification. In relation to describing the present disclosure, when the detailed description of the relevant known technology is determined to unnecessarily obscure the gist of the present disclosure, the detailed description may be omitted.

FIG. 1 is a schematic diagram illustrating a network 400 (in particular, a 5G network) environment in which an image-based information providing apparatus 100, various devices 200, and an information providing system 300 are connected to each other according to an embodiment of the present disclosure.

The image-based information providing apparatus 100 may provide information related to an image to the various devices 200 and the information providing system 300, based on the image such as a still image or a moving image.

The image-based information providing apparatus 100 may include mobile devices such as a mobile phone, a smart phone, a laptop computer, a digital broadcasting terminal, a personal digital assistant (PDA), a portable multimedia player (PMP), a navigator, a slate PC, an ultra-book, and a wearable device (for example, a smart watch, a smart glass, or a head mounted display (HMD)), and may include stationary devices such as a digital TV set, a desktop computer, and digital signage.

The various devices 200 may include a computer 200a, a home appliance such as a refrigerator, a washing machine, an air conditioner, or an AI speaker, an autonomous vehicle 200b, and a robot 20c, and may transmit and receive various information items through the network 400.

The various devices 200 may be wirelessly connected to the image-based information providing apparatus 100 through the network 400 (for example, the Internet). According to an embodiment, the various devices 200 may include the above-described mobile phone, smart phone, and laptop computer.

The image-based information providing apparatus 100 may communicate with the information providing system 300 through the network 400 by using a communication module. The image-based information providing apparatus 100 may request the information providing system 300 to provide various information items, and may receive various calculated/searched information items from the information providing system 300. The calculation/search may include a calculation or search related to AI.

The image-based information providing apparatus 100, the various devices 200, and the information providing system 300 that are mounted with 5G modules may transmit and receive data at a speed of 100 Mbps to 20 Gbps (or more) and may thus transmit large capacity moving image files to various devices, and may be driven by low power to minimize power consumption. The transmission speed may be implemented differently depending on the embodiment.

The information providing system 300 that provides various functions may include various servers/systems capable of communication. The network 400 may be a 5G mobile communication network, a local area network, or the Internet, and may provide communication environments for devices by wire or wirelessly.

FIG. 2 is a view schematically illustrating an operation of an image-based information providing apparatus 100 according to an embodiment of the present disclosure.

The image-based information providing apparatus 100 may include a camera, and may photograph an object Ob1a arranged in the same space. The photographed object Ob1a may be displayed as Ob1b on a display 141.

In this case, the image-based information providing apparatus 100 may display specification information of the object Ob1a on the display 141 based on AR, a type of XR. In a selective embodiment, the image-based information providing apparatus 100 may display the specification information of the object Ob1a on the display 141 based on VR or MR.

Here, the specification information may include uniform standard information such as information on quality, shape, size, and performance of a product or material. According to an embodiment, the specification information may include dimension information on measurements that indicate a size, a width, an area, and a volume of the object. The dimension information may include information (for example, one-dimensional information for a straight line, two-dimensional information for a plane, and three-dimensional information for geometric space) that may represent a width of a mathematical space.

In detail, the image-based information providing apparatus 100 may display, on the display 141, specification information ARI1, specifically, width information ARI1a and height information ARI1b, of the object Ob1a.

In this case, the image-based information providing apparatus 100 may include a function of measuring the specification information of the object Ob1a by using various sensors and cameras. In a selective embodiment, the image-based information providing apparatus 100 may also obtain the specification information of the object Ob1a through communication with the object Ob1a.

The image-based information providing apparatus 100 may display, on the display 141, a search button (430 of FIG. 4) for inputting a search command.

FIG. 3 is a block diagram illustrating a configuration of the image-based information providing apparatus 100 according to an embodiment of the present disclosure.

Referring to FIG. 3, the image-based information providing apparatus 100 may include a communicator 110, an input unit 120, a sensing unit 130, an output unit 140, a storage 150, a power supply 160, and a processor 190. Since the elements illustrated in FIG. 3 are not essential to implementing the image-based information providing apparatus 100, the image-based information providing apparatus 100 described in the current specification may have more or less elements than the above-described elements.

First, the communicator 110 may transmit and receive data to and from the various devices 200 and the information providing system 300 by using a wired or wireless communication technology. For example, the communicator 110 may transmit and receive sensor information, user input information, learning model information and control signal information to and from the various devices 200 and the information providing system 300. However, transmission information is not limited thereto.

Here, the communication technology used by the communicator 110 may be a global system for mobile communication (GSM), a code division multi-access (CDMA), long term evolution (LTE), 5G, a wireless local area network (WLAN), wireless-fidelity (Wi-Fi), Bluetooth™, radio frequency identification (RFID), infrared data association (IrDA), ZigBee, or near field communication (NFC).

The input unit 120 may include a camera 121 for inputting an image signal, a microphone 123 (hereinafter, referred to as a "mic") for receiving an audio signal, and a user input unit for receiving information from a user. Here, a signal obtained by the camera 121 or the mic 123 may be referred to as sensing data or sensor information by considering the camera 121 or the mic 123 as a sensor. The input unit 120 comprises at least one of a inputter.

The input unit 120 may obtain input data to be used when obtaining an output by using learning data and a learning model 151 for model learning. The input unit 120 may obtain unprocessed input data. In this case, the processor 190 may extract an input feature as pre-processing for the input data.

The sensing unit 130 may obtain at least one of internal information of the image-based information providing apparatus 100 and peripheral environment information and user information of the image-based information providing apparatus 100, by using various sensors.

Here, a sensor included in the sensing unit 130 may be a distance sensor 131, a proximity sensor, an illumination sensor, an acceleration sensor, a magnetic sensor, a gyro sensor, an inertial sensor, an RGB sensor, an IR sensor, a fingerprint recognizing sensor, an ultrasonic wave sensor, an optical sensor, a microphone, lidar, or radar. Here, the distance sensor 131 may measure a distance between the object and the image-based information providing apparatus 100.

The output unit 140 may generate an output related to senses of sight, hearing, or touch. The output unit 140 may include the display 141 for outputting visual information, a speaker for outputting auditory information, and a haptic module for outputting tactile information.

The storage 150 stores data that supports various functions of the image-based information providing apparatus 100. The storage 150 may store a plurality of application programs or applications driven by the image-based information providing apparatus 100, and data items and instructions for an operation of the image-based information providing apparatus 100.

The storage 150 may store information required for performing an operation by using AI, machine learning, and an ANN. The storage 150 may store the above-described learning model 151. The learning model 151 may be used for inferring a resultant value for new input data (that is not learning data), and the inferred value may be used as a basis of determination for performing a certain operation.

Under control of the processor 190, the power supply 160 receives external power and internal power, and supplies the received power to the elements of the image-based information providing apparatus 100. The power supply 160 includes a battery, and the battery may be a built-in battery or an exchangeable battery. The battery may be charged by a wired or wireless charging scheme, wherein the wireless charging scheme may include a magnetic induction scheme or a magnetic resonance scheme.

The processor 190 is a module for controlling the elements of the image-based information providing apparatus 100. The processor 190 may refer to a data processing device mounted in hardware, which has a physically structured circuit in order to perform functions represented by a code or instruction included in a program. Examples of the data processing device mounted in the hardware include, but are not limited to, a microprocessor, a central processing unit (CPU), a processor core, a multiprocessor, an application-specific integrated circuit (ASIC), and a field programmable gate array (FPGA).

The processor 190 may additionally include a learning processor for performing an AI operation, or may include the learning processor therein. The processor 190 may train a model configured by the ANN by using the learning data. Here, the ANN that has been trained or is being trained may be referred to as the learning model 151. The learning model 151 may be used for inferring the resultant value for the new input data (that is not learning data), and the inferred value may be used as the basis of determination for performing the operation.

Here, the processor 190 may be implemented to perform AI processing together with a learning processor of an AI server (for example, the information providing system 300).

The processor 190 may recognize the object arranged in the photographing range, and may obtain the specification information of the recognized object. Here, the object may be an item. However, the object is not necessarily limited to an item, and may include a user and an animal.

The processor 190 may display the specification information of the object on the display 141 together with the object based on AR, as illustrated in FIG. 1.

The processor 190 may obtain item information of the object based on the specification information of the object. Here, the item information may include various information items of the object, such as detailed specification information, model information, characteristic information, external appearance information, function information, shape information, and use method information of the item.

When the object is an item, the processor 190 may obtain information on one or more search items with similarity to the item information of the object in a predetermined range, based on the previously stored learning model 151.

For example, the processor 190 may search for an item having similarity of no less than 50% to a previously stored object based on the item information considering the specification information, and may output the searched item. In a selective embodiment, the similarity may be set to vary in accordance with search time, search accuracy, an amount of data, other event information, and intention information of the user.

In another embodiment, the image-based information providing apparatus 100 may receive the information on the search item from the external information providing system 300 without including the information on the search item therein.

In detail, the processor 190 may transmit the item information of the object to the information providing system 300 through the communicator 110, and the information providing system 300 may provide, to the communicator 110, one or more information items on the search item having the similarity to the item information of the object in the predetermined range, by performing the AI operation. When there is no information in the information providing system 300, the information providing system 300 may receive the corresponding information from a communicably connected server/system.

When the information on the search item is obtained, the processor 190 may display the information on the search item on the display 141 with the similarity to the specification information of the object prioritized.

For example, the processor 190 may display an image of the search item and the information on the search item to which the specification information of the object is similar in the predetermined range on the display 141.

Hereinafter, a detailed operation of the image-based information providing apparatus 100 according to various embodiments of the present disclosure will be described with reference to FIGS. 4 to 15.

FIG. 4 is a view illustrating an operation of the image-based information providing apparatus 100 for displaying specification information of an object based on AR according to an embodiment of the present disclosure.

The processor 190 may photograph an object Ob3a in a photographing range 410 by using the camera 121. Here, the image-based information providing apparatus 100 may drive a camera 121 application, and the application may be an AR application with an activated AI function, for providing an AR item.

In this case, the processor 190 may display a menu 420 for activating a function of obtaining the specification information on the display 141 and, when an activation button 423 is selected by the user, may measure the specification information and may reflect the measured specification information in an image. The processor 190 may display height information ARI2 of the object.

Here, the specification information may include various measurement information items including width information and height information. In accordance with an item, measurement information of another region may be set as the specification information.

For example, when the height of the item exceeds a predetermined range, the processor 190 may display the height information and, when the item is a monitor or TV set, a diagonal length of a screen may be set as the specification information.

The processor 190 may display specification information ARI2 of the object Ob3a on the display 141 together with the object Ob3a, based on AR. Here, the processor 190 may display a search button 430 that receives a search command.

When the search button 430 is selected, the processor 190 may obtain search information based on the object Ob3a and the specification information, or from the information providing system 300. When the object Ob3a is an item, the search information may include information on the search item.

As illustrated in FIGS. 5 and 6, the processor 190 may provide the information on the search item. FIG. 5 is a view illustrating an operation of the image-based information providing apparatus 100 for displaying information on a search item by a first method when the search command relating to the object Ob3a is inputted, according to an embodiment of the present disclosure. FIG. 6 is a view illustrating an operation of the image-based information providing apparatus 100 for displaying information on a search item by a second method when the search command relating to the object Ob3a is inputted, according to an embodiment of the present disclosure.

Referring to FIG. 5, the processor 190 may display the information on the search item with similarity to the specification information of the object Ob3a prioritized. The processor 190 may display a plurality of item images 440 (440a to 440n) having a predetermined similarity to the specification information of the object Ob3a.

The processor 190 may set similarity to the specification information of the object Ob3a as a filter, may filter information on a search item of which similarity to the specification information of the object Ob3a is outside a predetermined range, and may display, through the display 141, information on a search item of which similarity to the specification information of the object Ob3a is in the predetermined range. For example, the processor 190 may display only information on a search item of 7 inches to 9 inches.

Here, when a "see more search results" menu 455 is selected, the processor 190 may display information on a search item with different specification information.

Referring to FIG. 6, the processor 190 may categorize information items on search items (see 471 and 471a to 471c), may display the categorized information items, and may display the information items on the search items corresponding to the respective categories. For example, the processor 190 may display item information items 471aa and 471ab corresponding to the category 471a of no more than 6 inches, and display item information items 471ba to 471bc corresponding to the category 471b of 7 inches to 9 inches, and when information items on more search items are provided, may provide an item 471bn by which the information items on the more search items may be selected. The processor 190 may display item information items 471ca to 471cc corresponding to the category 471c of 10 inches to 12 inches, and when information items on more search items are provided, may provide an item 471cn by which the information items on the more search items may be selected. In addition, the processor 190 may display that corresponding information is specific item information 461.

FIG. 7 is a view illustrating an operation of the image-based information providing apparatus 100 for displaying specification information of an object based on AR according to another embodiment of the present disclosure.

The processor 190 may photograph an object Ob5a in the photographing range 410 by using the camera 121. In this case, the processor 190 may display the menu 420 for activating the function of obtaining the specification information on the display 141, and when the activation button 423 is selected by the user, may measure the specification information and reflect the measured specification information in an image. Then, the processor 190 may display diagonal information ARI3 of the screen of the object based on AR.

Here, the processor 190 may display different specification information depending on the item information of the object. The displayed specification information may vary in accordance with attribute information, preference information, width or height information, area information or volume information of an item. The specification information may be set by the previously stored learning model 151.

The processor 190 may display the specification information of the object Ob5a on the display 141 together with the object Ob5a, based on AR. Here, the processor 190 may display the search button 430 that receives the search command.

When the search button 430 is selected, the processor 190 may obtain the search information from therein or from the information providing system 300, based on the object Ob5a and the specification information. When the object Ob5a is an item, the search information may include information on the search item.

FIG. 8 is a view illustrating an operation of the image-based information providing apparatus 100 for displaying information on a search item when a search command relating to the object is inputted according to another embodiment of the present disclosure.

Referring to FIG. 8, the processor 190 may select only a TV set (and/or monitor) corresponding to the object Ob5a (FIG. 7) from the search item, and may display the selected TV set (and/or monitor) (see 483 and 483a to 483h). Accordingly, when a display area is smaller than a predetermined size, filtering may be performed.

In addition, the processor 190 may provide various search conditions 481. For example, the processor 190 may provide, to the user, a "see by purchase preference" menu 481a, a "see by manufacturer" menu 481b, and a "see by dimension" menu 481c from among the information on the search item, thereby providing the information on the search item in terms of different options.

FIG. 9 is a view illustrating an operation of the image-based information providing apparatus 100 for displaying an internal region of a search item and providing function information when a search command relating to the object is in inputted put according to an embodiment of the present disclosure.

Referring to FIG. 9, when the search button (430 of FIG. 4) is inputted, the processor 190 may display external appearance information of an item, function information of the item, and shape information of the item, based on the item information of the object Ob1b.

In addition, the processor 190 may rotate the object Ob1b 360 degrees, and in a case of an item with a door, may open the door of the item. In addition, the processor 190 may display various function information items 910.

Here, when a salesperson describes characteristics and information of a product of a specific manufacturer for the user in a home appliances shop, the processor 190 may provide the image of FIG. 9 by using a tablet PC for the convenience of the user.

FIG. 10 is a view illustrating an operation of the image-based information providing apparatus 100 for displaying an internal region of a search item and providing information on a method of use when a search command relating to an object is inputted according to another embodiment of the present disclosure.

Referring to FIG. 10, the processor 190 may display methods of use of spaces AA1 and AA2 when the object Ob1b is open (see 933a and 933b). For example, the processor 190 may provide a method of removing dust from the first space AA1 by a request 933a1 of the user, and may provide a method of managing a plumbing container of the second space AA2 by a request 933b1 of the user. At this time, the processor 190 may provide, to the user, an application for connecting a linked page.

FIG. 11 is a view illustrating an operation of an image-based information providing apparatus for providing one or more search items of the same kind and having different specification information when a search command relating to an object is inputted according to an embodiment of the present disclosure.

Referring to FIG. 11, when the search button (430 of FIG. 4) is selected, the processor 190 may display information on the search item.

Here, when one or more search items of the same kind and having different specification information are searched, the processor 190 may provide the one or more search items together. The search items may include a clothing management device, an oven, a refrigerator, a kimchi refrigerator, a washing machine, a wine cellar, and a TV set.

According to an embodiment, when the object is the clothing management device and the search item is a plurality of models Ob1e and Ob1f, the processor 190 may display the plurality of clothing management devices Ob1e and Ob1f. In addition, when a "compare model specifications" menu 1110 is selected, the processor 190 may provide a UI screen for comparing the plurality of items with each other. In a selective embodiment, the processor 190 may display the search items Ob1e and Ob1f, may compare the data information items of the search items with each other, and may display the comparison result.

In a selective or additional embodiment, the processor 190 may display a plurality of items included in a model lineup of a specific manufacturer, and may compare items included in similar model lineups of various manufacturers with each other and display the comparison result on the display 141. The processor 190 may display items with different specification information, and may compare items with similar functions to each other and display the comparison result on the display 141.

FIG. 12 is a view illustrating an operation of an image-based information providing apparatus for providing a table for comparing information items on search items when a specific menu (the "compare model specifications" menu 1110) of FIG. 11 is selected.

Referring to FIG. 12, exemplarily, the image-based information providing apparatus 100 may display, on the display 141, model name information, capacity information, design information, warranty period information, Wi-Fi support information, indoor dehumidification function information, purchase popularity information, manufacturer information, and suggestion information of the plurality of models Ob1e and Ob1f.

The processor 190 may suggest purchase information based on the user's situation. For example, the processor 190 may display a suggestion phrase such as "S1 is recommended for a family of four. Would you like to purchase it?" (see 1210), and when a "link" menu 1220 is selected, may move to a corresponding link page. The processor 190 may highlight various functional differences of the models, and provide such information to the user.

FIG. 13 is a view illustrating an operation of the image-based information providing apparatus 100 when only a partial region of an object is recognized according to an embodiment of the present disclosure.

The processor 190 may photograph an object Ob7a in the photographing range 410 by using the camera 121. The object Ob7a may be a partial region of a real object.

In this case, the processor 190 may display the menu 420 for activating a function of obtaining specification information on the display 141. When the activation menu 423 is selected by the user, the specification information is measured, and the measured information may be reflected in an image. The processor 190 may display specification information ARTS, specifically, width information ARI5a and height information ARI5b, of the object.

The processor 190 may display the specification information of the object Ob7a on the display 141 together with the object Ob7a, based on AR.

When the search button 430 is selected, the processor 190 may provide information on the partial region and specification information of the partial region to the information providing system 300 through the communicator 110.

Then, the processor 190 may receive information on a search item having similarity in a predetermined range to the information on the partial region and the specification information of the partial region from the information providing system 300 through the communicator 110. That is, although only the partial region of the object is photographed, the processor 190 may obtain an entire region of the object corresponding to the partial region photographed, by an item matching program of the information providing system 300. In a selective embodiment, the function may be implemented by the image-based information providing apparatus 100.

FIG. 14 is a view illustrating an operation of the image-based information providing apparatus when the search button (430 of FIG. 13) relating to the object of FIG. 13 is inputted.

The processor 190 may display a partial region Ob7b of the object, may extract a remaining region other than the partial region of the object from the information on the search item, and may provide the extracted region based on AR (see Ob7c). The processor 190 may display specification information ARI7a and ARI7b on the display 141. In a selective embodiment, the processor 190 may display an object based on the information on the search item, which is received from the information providing system 300, without combining images (a partial region image of the object+ an AR image).

FIG. 15 is a view illustrating an operation of the image-based information providing apparatus 100 when a plurality of objects are recognized according to an embodiment of the present disclosure.

Referring to FIG. 15, when a plurality of objects Ob9a to Ob9c are recognized, the processor 190 may select one of the plurality of objects Ob9a to Ob9c. The processor 190 may determine the object by a manipulation of the user, or may determine the object Ob9a that occupies the greatest part of the photographing range 410 as the object. Therefore, when the plurality of objects are arranged in the photographing range, the processor 190 may select and determine the object based on user preference or a previously set program.

FIG. 16 is a sequence diagram illustrating a method of driving the image-based information providing apparatus 100 according to an embodiment of the present disclosure.

First, the image-based information providing apparatus 100 recognizes the object arranged in the photographing range of the camera in step S710.

Then, the image-based information providing apparatus 100 obtains the specification information of the object in step S720.

Thereafter, the image-based information providing apparatus 100 displays the specification information of the object together with the object based on AR in step S730.

Then, when a predetermined search command is inputted, the image-based information providing apparatus 100 obtains the search information based on the object and the specification information in step S740.

Finally, the image-based information providing apparatus 100 provides the search information in step S750.

The method of providing the information of the image-based information providing apparatus 100 includes obtaining the item information of the object based on the specification information of the object.

Step S740 may include obtaining the information on one or more search items with similarity in the predetermined range to the item information of the object based on the previously stored learning model.

In another embodiment, step S740 may include transmitting the item information of the object to the information providing system, and obtaining the information on the one or more search items with similarity in the predetermined range to the item information of the object.

Step S750 may include providing the information on the search item with the similarity to the specification information of the object prioritized.

In detail, in a selective and additional embodiment, step S750 may include setting the similarity to the specification information of the object as a filter and filtering the information on the search item of which the similarity to the specification information of the object is outside a predetermined range, and providing the information on the search item in the predetermined range.

In addition, step S750 may include providing at least one of the external appearance information of the item, the function information of the item, the shape information of the item, or the method of use of the item, based on the item information of the object. Here, the shape information may include a shape of a three-dimensional item.

In a selective embodiment, in step S750, when one or more search items of the same kind and having different specification information are searched, the one or more search items are provided together. Step S750 may include comparing data information items on the one or more search items with each other, and providing the comparison result.

When only a partial region of the object is recognized, step S720 may include obtaining the specification information of the partial region. At this time, step S740 may include transmitting the information on the partial region and the specification information of the partial region to the information providing system, and obtaining the information on the search item having similarity in the predetermined range to the information on the partial region and the specification information of the partial region.

In a detailed or selective embodiment, step S750 may include displaying the partial region of the object, and extracting the remaining region other than the partial region of the object from the information on the search item, and providing the extracted region based on AR.

In a selective embodiment, when one or more objects are recognized in the photographing range of the camera, step S710 may include selecting the object by the manipulation of the user, or selecting the object that occupies the greatest part of the photographing region.

The present disclosure described above may be implemented as a computer-readable code in a medium in which a program is recorded. The computer readable medium includes all types of recording devices in which data readable by a computer system can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like. In addition, the computer may include the processor 190 of the image-based information providing apparatus 100.

While the present disclosure has been explained in relation to its embodiments, it is to be understood that various modifications thereof will become apparent to those skilled in the art upon reading the specification. Therefore, it is to be understood that the disclosure herein is intended to cover such modifications as fall within the scope of the appended claims.

What is claimed is:

1. An image-based information providing method comprising:
   recognizing an object arranged in a photographing range of a camera;
   obtaining specification information of the object and item information of the object based on the specification information of the object;
   displaying the specification information of the object together with the object based on augmented reality (AR);
   obtaining search information based on the specification information of the object when a predetermined search command is inputted; and
   providing the search information,
   wherein the obtaining of the search information comprises obtaining information on one or more search items having a similarity in a predetermined range to the item information of the object based on a previously stored learning model for inferring result data based on input data.

2. The image-based information providing method of claim 1, wherein the obtaining of the search information comprises:
   transmitting the item information of the object to an information providing system; and
   obtaining the information on the one or more search items having the similarity in the predetermined range to the item information of the object from the information providing system.

3. The image-based information providing method of claim 1, wherein the providing of the search information comprises providing information on a search item with a similarity to the specification information of the object prioritized.

4. The image-based information providing method of claim 3, wherein the providing of the information on the search item comprises:
   setting the similarity to the specification information of the object as a filter, and filtering information on a search item of which the similarity is outside a predetermined range; and
   providing the filtered information on the search item in the predetermined range.

5. The image-based information providing method of claim 1, wherein the providing of the search information comprises providing at least one of external appearance information of the search item, function information of the search item, shape information of the search item, or a method of use of a configuration of the search item, based on the item information of the object.

6. The image-based information providing method of claim 1, wherein, when one or more search items of a same kind and having different specification information are searched, the providing of the search information comprises:

comparing data information on the one or more search items with each other; and providing a result of the comparing.

7. The image-based information providing method of claim 1,
wherein, when only a partial region of the object is recognized, the obtaining of the specification information of the object comprises obtaining specification information of the partial region, and
wherein the obtaining of the search information comprises:
transmitting information on the partial region and the specification information of the partial region to an information providing system; and
obtaining information on a search item with a similarity in a predetermined range to the information on the partial region and the specification information of the partial region.

8. The image-based information providing method of claim 7, wherein the providing of the search information comprises:
displaying the partial region of the object;
extracting a remaining region other than the partial region of the object from the information on the search item; and
complementing the extracted region based on the AR.

9. The image-based information providing method of claim 1, wherein, when one or more objects are recognized in the photographing range of the camera, the recognizing of the object comprises selecting an object by a manipulation of a user or selecting an object that occupies a greatest part of a photographing region.

10. An image-based information providing apparatus comprising:
an inputter including a camera;
a display;
a storage configured to store a learning model for inferring result data based on input data; and
a processor configured to recognize an object arranged in a photographing range of the camera, and obtain specification information of the recognized object, and obtain item information of the object based on the specification information of the object,
wherein the processor displays the specification information of the object on the display together with the object based on augmented reality (AR), obtains search information based on the object and the specification information when a predetermined search command is inputted through the inputter, and provides the obtained search information, and
wherein the processor obtains information on one or more search items with a similarity in a predetermined range to the item information of the object, based on the learning model.

11. The image-based information providing apparatus of claim 10, further comprising a communicator configured to communicate with an information providing system,
wherein the processor transmits the item information of the object to the information providing system through the communicator, and obtains the information on the one or more search items with the similarity in the predetermined range to the item information of the object from the information providing system through the communicator.

12. The image-based information providing apparatus of claim 10, wherein the processor provides, through the display, information on a search item with a similarity to the specification information of the object prioritized.

13. The image-based information providing apparatus of claim 12, wherein the processor sets the similarity to the specification information of the object as a filter and filters information on a search item of which the similarity is outside a predetermined range, and provides the filtered information on the search item in the predetermined range.

14. The image-based information providing apparatus of claim 10, wherein the processor provides, through the display, at least one of external appearance information of the search item, function information of the search item, shape information of the search item, or a method of use of a configuration of the search item, based on the item information of the object.

15. The image-based information providing apparatus of claim 10, wherein, when one or more search items of a same kind and having different specification information are searched, the processor compares data information on the one or more search items with each other, and provides a result of the comparison through the display.

16. The image-based information providing apparatus of claim 10, wherein, when only a partial region of the object is recognized, the processor obtains specification information of the partial region, transmits information on the partial region and the specification information of the partial region to an information providing system through the communicator, and obtains information on a search item with a similarity in a predetermined range to the information on the partial region and the specification information of the partial region from the information providing system through the communicator.

* * * * *